United States Patent Office 2,980,709
Patented Apr. 18, 1961

2,980,709

PREPARATION OF GREY TO BLACK DYESTUFFS

David I. Randall, New Vernon, and John Taras, Alpha, N.J., and Tellis A. Martin, Evansville, Ind., assignors to General Aniline & Film Corporation, New York, N.Y., a corporation of Delaware No Drawing. Filed Sept. 27, 1956, Ser. No. 612,376

3 Claims. (Cl. 260—354)

This invention relates to vat dyestuffs of the dibenzanthrone series, and relates more particularly to the preparation of new and improved vat dyestuffs of the dibenzanthrone series which dye vegetable fibers in grey to black shades.

A number of dyestuffs of the dibenzanthrone series have been produced which dye in shades ranging from blue to green-black and some of these have been employed in the art as blacks when shaded with sufficient amount of shading color or when after-treated with an oxidizing agent during the process of application of the fiber.

It is an object of this invention to provide new and improved dyestuffs of the dibenzanthrone series which dye vegetable fibers directly without any after-treatment in grey to black shades of good fastness properties, being especially fast to chlorine which is a common deficiency of the direct blacks of the dibenzanthrone series currently on the market.

Another object of this invention is the provision of a novel process for preparing new vat dyestuffs of the dibenzanthrone series by the oxidation of an aminodibenzanthrone in a solvent therefor.

Other objects of this invention will appear from the following detailed description and appended claims.

In accordance with the instant invention, vat dyestuffs which dye vegetable fibers in desirable blue-grey to black shades of excellent fastness properties when applied by suitable coloring processes are obtained by the oxidation of an aminodibenzanthrone, or diaminobenzanthrone made by direct nitration of dibenzanthrone followed by subsequent reduction, or by the nitration of dibenzanthronyl followed by reduction and the final ring closure, in a suitable solvent. The orientation of the amino groups will be different depending upon which of the above general methods is employed and consequently somewhat different shades of grey to black will be obtained in the process of this invention. The percentage of nitrogen in the starting aminodibenzanthrones may vary; the most desirable grey to black dyestuffs are obtained when the aminodibenzanthrones containing from 2.7 to 7% nitrogen are subjected to the process of this invention.

Specifically, the process of this invention comprises the production of the new vat dyestuffs by the action of sodium nitrite on an aminodibenzanthrone in nitrobenzene, trichlorobenzene or other suitable solvent at a temperature above about 200° C., both in the presence or absence of anthraquinone derivatives containing at least one negative substituent such as a halogen atom or a nitro group. By carrying out the oxidation in this manner, the dyestuffs obtained exhibit improved properties as direct greys to blacks, such as build-up and bleach fastness. Furthermore, these dyestuffs will dye in more neutral shades of grey and black than those obtained by the oxidations carried on in caustic solution described in the prior art.

The instant invention is further illustrated by the following examples which are not intended to be in any way limitative. The parts given are by weight.

*Example I*

25 parts of aminodibenzanthrone (prepared by direct nitration of dibenzanthrone followed by reduction to the amino derivative) are added to a suspension of 300 parts nitrobenzene, 35 parts soda ash, 1 part copper powder, 1 part iodine. The reaction mass is heated to 205–210° C. and then there is added over a period of six hours 15 parts of sodium nitrite. The reaction mass is now kept at 205–221° C. for ten hours longer. The dyestuff is isolated by filtration, by suction or by distilling off the solvent, if desired with the aid of reduced pressure or of steam or both. The dyestuff which is obtained in good yields is acid pasted in order to get into proper physical form for dyeing. The black powder thus obtained dyes cotton blue-grey to black shades of good light, chloride and wash fastness.

*Example II*

25 parts of aminodibenzanthrone are added to a suspension of 500 parts nitrobenzene, 35 parts soda ash, 25 parts sodium nitrite, 2 parts copper, 2 parts iodine. The reaction mass is heated to 205–210° C. and held at this temperature for ten hours. The dyestuff is isolated as described in Example I. The black dyestuff thus obtained dyes cotton blue-grey to black shades of good fastness properties.

*Example III*

25 parts aminodibenzanthrone are added to a mixture of 500 parts nitrobenzene, 35 parts soda ash, 2 parts copper and 2 parts iodine. The reaction mass is heated to 205–210° C. and held at this temperature for ten hours. The dyestuff is isolated as described in Example I. It dyes cotton a dull green shade which changes to a black shade when subjected to the usual chlorine test.

*Example IV*

25 parts aminodibenzanthrone are added to a mixture of 500 parts trichlorobenzene, 35 parts soda ash, 25 parts sodium nitrite, 2 parts copper, 2 parts iodine. The reaction mass is heated at 205–210° C. for ten hours and then worked up as described in Example I. The dyestuff thus obtained dyes cotton a grey to black shade having good chlorine and light fastness and fair light fastness.

If in the above example, the sodium nitrite is omitted a grey-green dyeing is obtained from the resultant dyestuff whose chlorine fastness is poor changing the dyeing to a black.

*Example V*

25 parts diaminodibenzanthrone (prepared by dinitration of dibenzanthrone followed by reduction to the diamino derivative) are added to a suspension of 500 parts nitrobenzene, 35 parts soda ash, 25 parts sodium nitrite, 2 parts copper, and 2 parts iodine. The reaction mass is heated at 205–210° C. for ten hours and then worked up in order to isolate the dyestuff as described in Example I. The dyestuff dyes cotton fibers blue-grey to black shade of excellent chlorine and wash fastness.

If the sodium nitrite is omitted in the above example, a dyestuff is obtained which dyes cotton grey-green shades whose chlorine fastness is extremely poor.

*Example VI*

14.1 parts aminodibenzanthrone and 5.4 parts dibromopyranthrone are added to a mixture of 400 parts nitrobenzene, 11.3 parts anhydrous sodium acetate, 4.5 parts copper. The reaction mass is heated at reflux for eight hours and then there is added 7.0 parts aminodibenzanthrone and 8.0 parts sodium nitrite. The reaction mass is now heated at 205-210° C. for eighteen hours longer. The dyestuff which is isolated as described in Example I dyes cotton neutral grey to black shades of excellent chlorine and wash fastness properties and fair light fastness.

*Example VII*

15.7 parts of aminodibenzanthrone and 11.5 parts of tetrachloroanthraquinone are added to a mixture of 400 parts nitrobenzene, 10 parts anhydrous sodium acetate and 4.5 parts copper. The reaction mixture is refluxed at 205-210° C. for eight hours. A second addition of 15.7 parts aminodibenzanthrone together with 15.7 parts of sodium nitrite is now made and the reaction is held at 205-210° C. for another ten hours. The dyestuff is isolated by the usual procedure. It dyes cotton a neutral grey to black shade of good chlorine and wash fastness.

*Example VIII*

15.7 parts aminodibenzanthrone and 16.3 parts dibromoanthranthrone are added to 400 parts nitrobenzene, 10 parts anhydrous sodium acetate, 4.5 parts copper. The reaction mass is heated at 205-210° C. for eight hours. An additional 15.7 parts of aminodibenzanthrone together with 15.7 parts sodium nitrite is now added and the reaction maintained at 205-210° C. for another ten hours. The dyestuff isolated by the usual procedure dyes cotton neutral grey to black shades of good chlorine and wash fastness.

*Example IX*

12.9 parts of Bz-1-6-dibromobenzanthrone and 15.7 parts aminodibenzanthrone is added, 400 parts nitrobenzene, 10 parts anhydrous sodium acetate, 4.5 parts copper. The reaction mixture is maintained at 205-210° C. for eight hours and then there is added 15.7 parts aminodibenzanthrone and 15.7 parts sodium nitrite. The reaction is now heated for ten hours at reflux. The isolated dyestuff dyes cotton grey to black shades of good chlorine and wash fastness.

While the vat dyes of our invention were described in connection with the coloration of cotton, since optimum results are obtained when the dyestuffs of our invention are applied to this material, it is to be understood that the new dyestuffs may also be employed for coloring other cellulosic materials, such as regenerated cellulose and cellulose esters, and also for the coloring of animal fibers, such as silk and wool, and as well as polymeric materials, such as nylon, the polyesters of terephthalic acid and ethylene glycol, the polymers of acrylonitrile, the copolymers of acrylonitrile and vinylchloride, vinyl resins and the like.

It is to be understood that the foregoing detailed description is merely given by way of illustration and that many variations may be made therein without departing from the spirit of our invention.

Having described our invention, what we desire to secure by Letters Patent is:

1. Process for the preparation of grey to black vat dyestuffs, which comprises heating a mixture of an aminodibenzanthrone, selected from the group consisting of monoaminodibenzanthrone and diaminodibenzanthrone, sodium nitrite, soda ash, copper and iodine in a solvent medium at a temperature above about 200° C., and separating the dyestuff formed from the reaction mixture.

2. Process for the preparation of grey to black vat dyestuffs, which comprises heating a mixture of an aminodibenzanthrone, selected from the group consisting of monoaminodibenzanthrone and diaminodibenzanthrone, sodium nitrite, soda ash, copper and iodine in a solvent medium at a temperature of 205 to 210° C. for 10 hours, and separating the dyestuff formed from the reaction mixture.

3. Process for the preparation of grey to black vat dyestuffs, which comprises heating a mixture of an aminodibenzanthrone, selected from the group consisting of monoaminodibenzanthrone and diaminodibenzanthrone containing from 2.7 to 7% nitrogen, sodium nitrite, soda ash, copper and iodine in a solvent medium at a temperature of 205 to 210° C. for 10 hours, and separating the dyestuff formed from the reaction mixture.

References Cited in the file of this patent

UNITED STATES PATENTS

| | | |
|---|---|---|
| 1,909,695 | Kunz et al. | May 16, 1933 |
| 2,310,087 | Howell | Feb. 2, 1943 |
| 2,334,891 | Wuertz et al. | Nov. 23, 1943 |
| 2,739,973 | Randall et al. | Mar. 27, 1956 |